United States Patent [19]

Angner et al.

[11] 4,057,693

[45] Nov. 8, 1977

[54] LOGIC CONTROL FOR ELECTRONIC KEY TELEPHONE LINE CIRCUIT

[75] Inventors: Ronald Joseph Angner, Freehold, N.J.; Marion Lee Blount, Palo Alto, Calif.; James Volney Lacy, Red Bank, N.J.

[73] Assignee: Bell Telephone Laboratories, Incorporated, Murray Hill, N.J.

[21] Appl. No.: 708,857

[22] Filed: July 28, 1976

[51] Int. Cl.² ............................................. H04M 1/72
[52] U.S. Cl. ..................................................... 179/99
[58] Field of Search ............................. 179/18 AD, 99

[56] References Cited

U.S. PATENT DOCUMENTS

| | | | |
|---|---|---|---|
| Re. 29,078 | 12/1976 | Tate ........................ | 179/99 |
| 3,895,192 | 7/1975 | Angner .................... | 179/99 |
| 3,920,928 | 11/1975 | Lye ......................... | 179/99 |
| 3,925,625 | 12/1975 | Angner .................... | 179/99 |

Primary Examiner—Kathleen H. Claffy
Assistant Examiner—Randall P. Myers
Attorney, Agent, or Firm—David H. Tannenbaum

[57] ABSTRACT

An electronic key telephone line circuit is disclosed for controlling the hold and disconnect conditions with respect to associated telephone stations in response to transient signals generated upon on-hook to off-hook and off-hook to on-hook transitions of those stations. Due to the nature of the switchhook contacts, the tip and ring leads open before the A-lead opens. Since the disconnect condition is determined from a transient signal caused by the tip and ring lead opening together with an A-lead open, and since by its very nature the transient response of the tip and ring lead transition can be finished before the A-lead opens, timing is used to delay the transient signal to insure that the line circuit goes into the proper mode.

9 Claims, 17 Drawing Figures

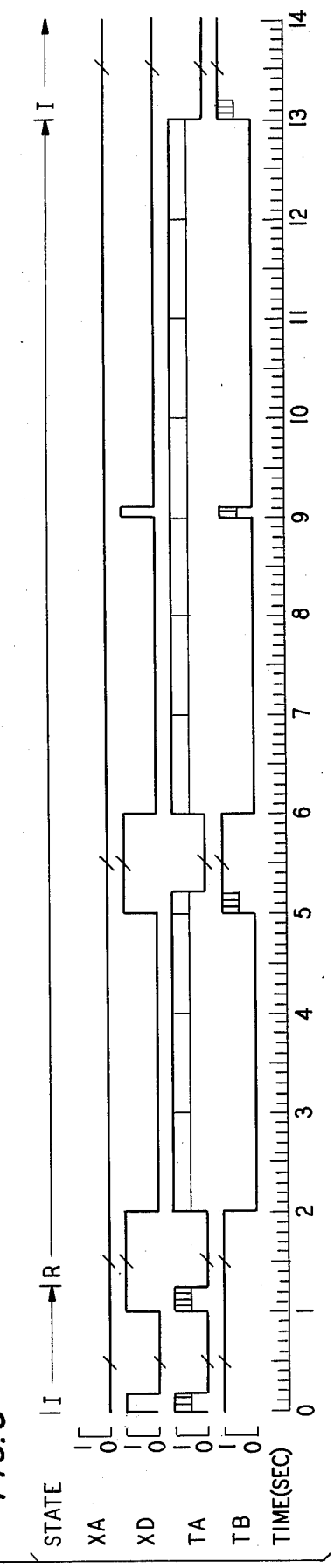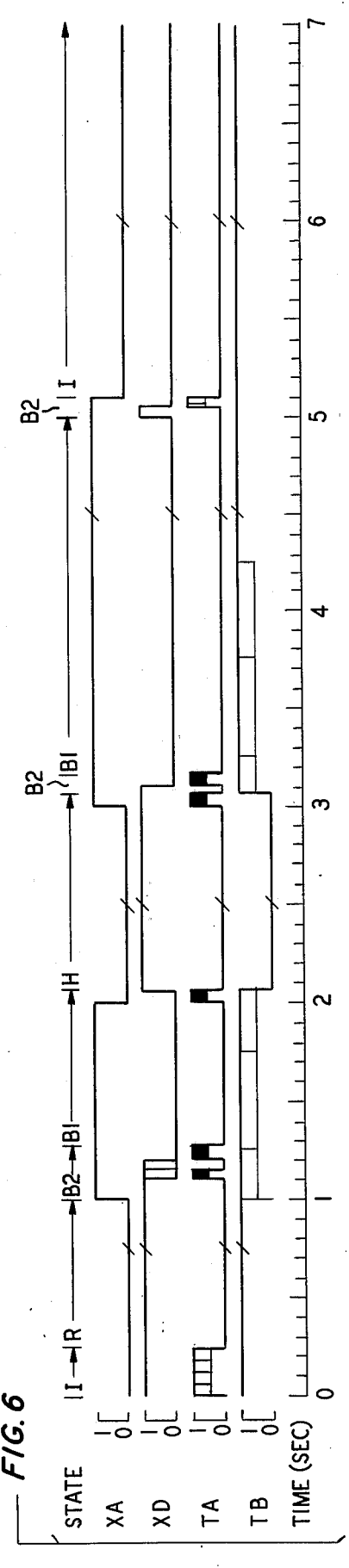

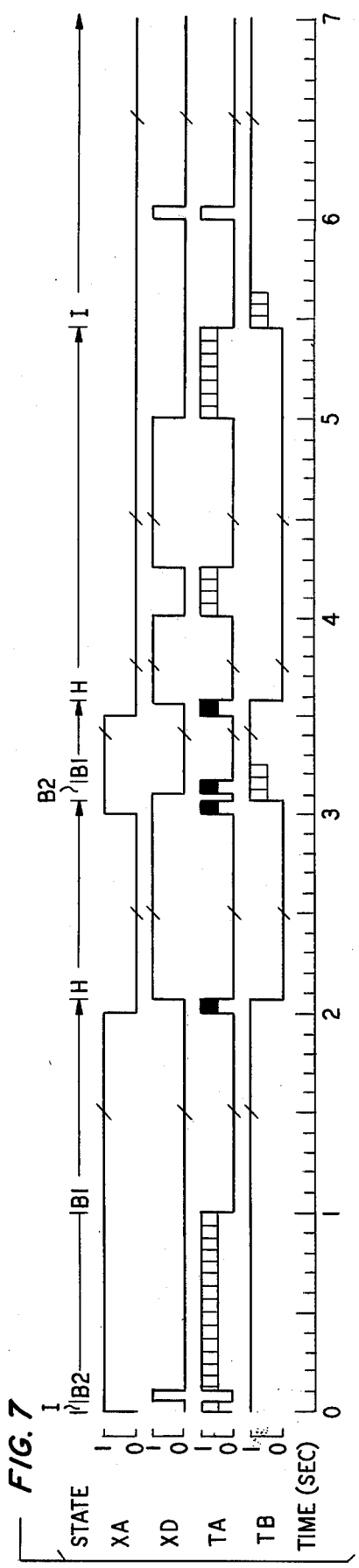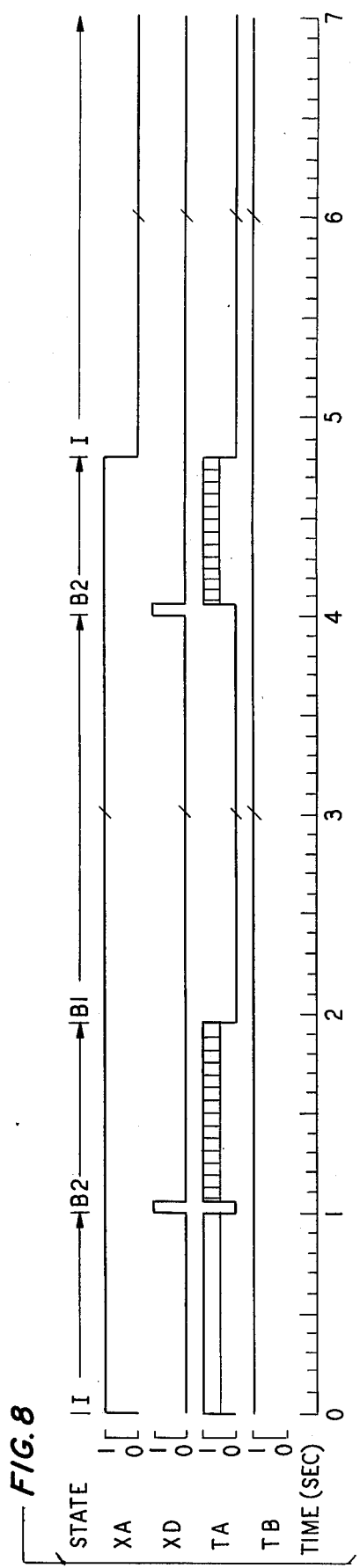

OUTPUT AND LOGIC BUFFERS

COUNTER FLIP-FLOP

5 STATE ASYNCHRONOUS MACHINE

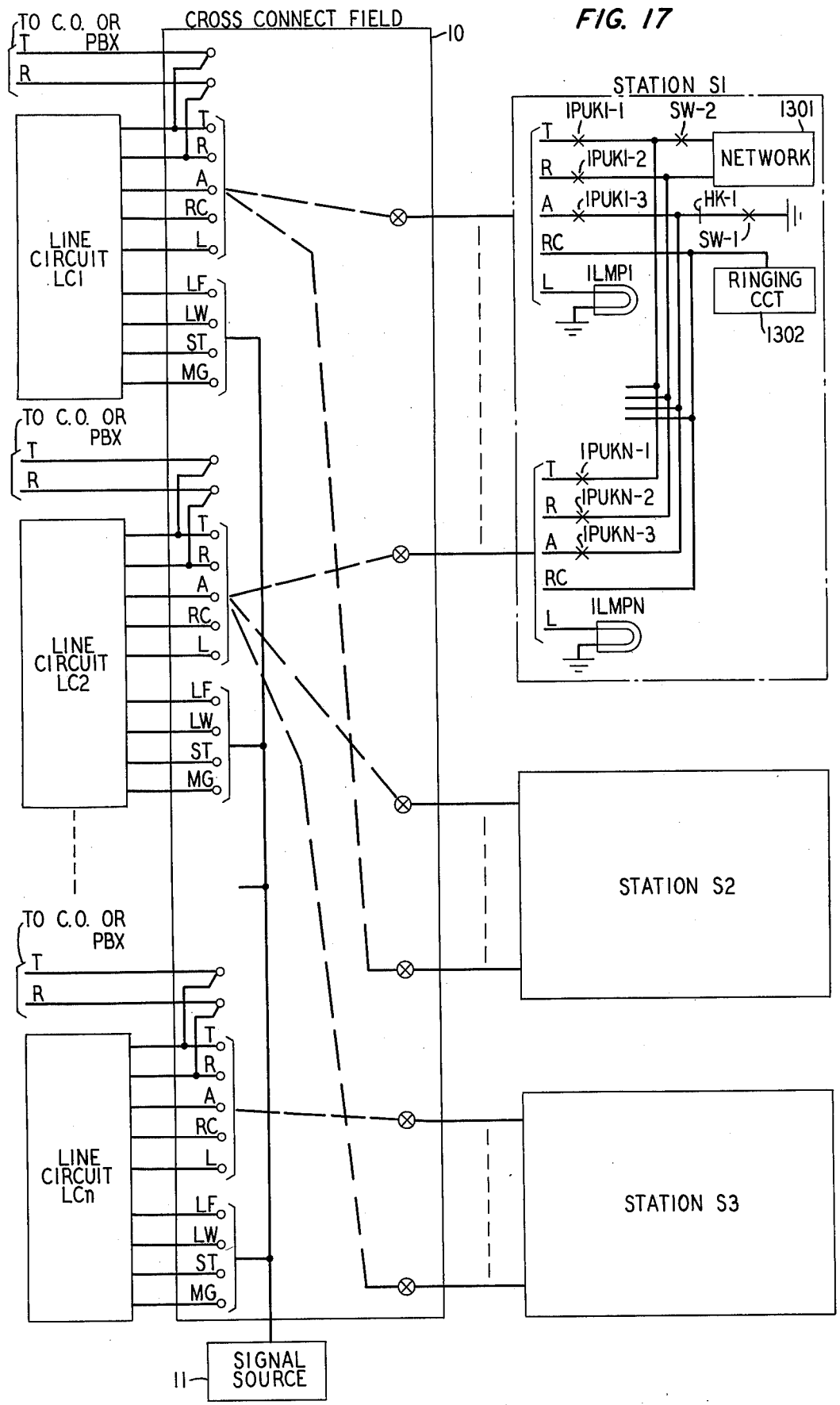

LOGIC CONTROL FOR ELECTRONIC KEY TELEPHONE LINE CIRCUIT

FIELD OF THE INVENTION

This invention relates generally to an improved key telephone line circuit, and, more particularly, to a key telephone line circuit for use in parallel across the communication leads.

BACKGROUND OF THE INVENTION

In U.S. Pat. No. 3,925,625 issued Dec. 9, 1975 to R. J. Angner et al, there is disclosed a key telephone line circuit which is connected in shunt across the tip and ring lead communication path between the central switching machine and the subscriber's station to control the HOLD, BUSY and IDLE conditions of the station and to provide the necessary visual and audible signaling to the stations. The line circuit disclosed in the above-identified patent operates to detect ac current flowing for ringing control, while also detecting the transient response of the system for hold and disconnect control. The transient signals are generated upon on-hook to off-hook or off-hook to on-hook circuit transitions.

Shunt control has several advantages, but the most important one is the perfect balance of the tip and ring circuitry at all times. Other advantages include the ease of application of music and tone-on-hold signals and the fact that the circuit can be removed for maintenance in any state but HOLD without disrupting customer service. The shunt principle of HOLD/DISCONNECT detection is as follows: When a key station goes on-hook, two things happen sequentially:
1. the tip and ring is disconnected at the telephone set which causes current to flow through the ring-up capacitor as it charges to $-48v$, and
2. the A-lead is broken.

When a line is placed on HOLD, the A-lead is broken but no current flows through the ring-up capacitor until sometime later. Thus, the HOLD/DISCONNECT distinction is made by detecting the presence of current flow in the ring-up capacitor before the A-lead is broken.

Due to the nature of the switchhook contacts, the tip and ring leads open before the A-lead opens on disconnect. Since the disconnect condition is determined from a transient signal caused by the tip and ring lead transition and thus can be finished before the A-lead opens, timing is used to remember the transient signal to insure that the line circuit goes into the proper state. However, under certain conditions if the transient signal of the immediately past transition were to be forgotten, the line circuit would respond to an A-lead opening by going into the HOLD state instead of going into the desired IDLE state.

Thus a problem exists when using electronics in the presence of various preexisting mechanical pecularities to detect transient signals, which by definition are only temporary in nature.

It is a further problem to arrange a key telephone line circuit, which must interface with any number of switching machines having widely varying signaling tolerances and with mechanical telephone stations also having varying operating tolerances to take advantage of integrated electronic technology.

Further problems exist when using the transient response of the line circuit for control purposes. Primarily, the problems come about due to normal voltage pulses on the line and when other equipment is connected in parallel with the line circuit.

SUMMARY OF THE INVENTION

These problems are solved by a digitally controlled line circuit containing an asynchronous sequential machine having five states and two digital timers. The circuit keeps track of the present state of the associated telephone station set and compares received signals against the present state to determine to which of the various other states, if any, the line circuit should change. The five states are: RING, IDLE, HOLD, BUSY 1 and BUSY 2. The two BUSY states are used to control actuation of the HOLD state, with the BUSY 2 state being used to control slow switchhook depressions. The disclosed line circuit is arranged such that some mode transitions are made with a first delay of the transient signal and some mode transitions are made with a second delay of the trnsient signal.

The machine which controls the electronic line circuit has two external inputs: one from an optical isolator in the tip/ring circuit and one from the A-lead. All timing functions are performed by digital circuits which are driven by a single, internal oscillator source.

Accordingly, it is one feature of our invention to arrange a digitally controlled machine in a manner which allows distinction between slow switchhook operation and a true HOLD condition by precisely timing each type of system occurrence and comparing the response against the present state of the machine.

Another feature of our invention is the ability to test for the presence of CO battery. The same LED that is used for indicating line circuit status is used for this function. The test can only be performed if the circuit is idle, thus not interfering with customer service.

Another feature of our invention is the arrangement of an electronic shunt line circuit for immediately allowing a transition to the HOLD state under some circumstances while delaying the capibility to make the transition to HOLD under other circumstances, depending upon the circuit state at the time of each transition.

Another feature of our invention is the arrangement of an electronic shunt line circuit for operation in situations where true transient pulses are inhibited.

BRIEF DESCRIPTION OF THE DRAWING

The principles of the invention as well as additional objects and features thereof will be fully appreciated from the illustrative embodiment shown in the drawing, in which:

FIGS. 5 through 8 and FIG. 16 show timing diagrams for the line circuit;

FIG. 17 shows in block diagram form the connection of our new key telephone line circuit into a key telephone system.

GENERAL DESCRIPTION

Figure 4:
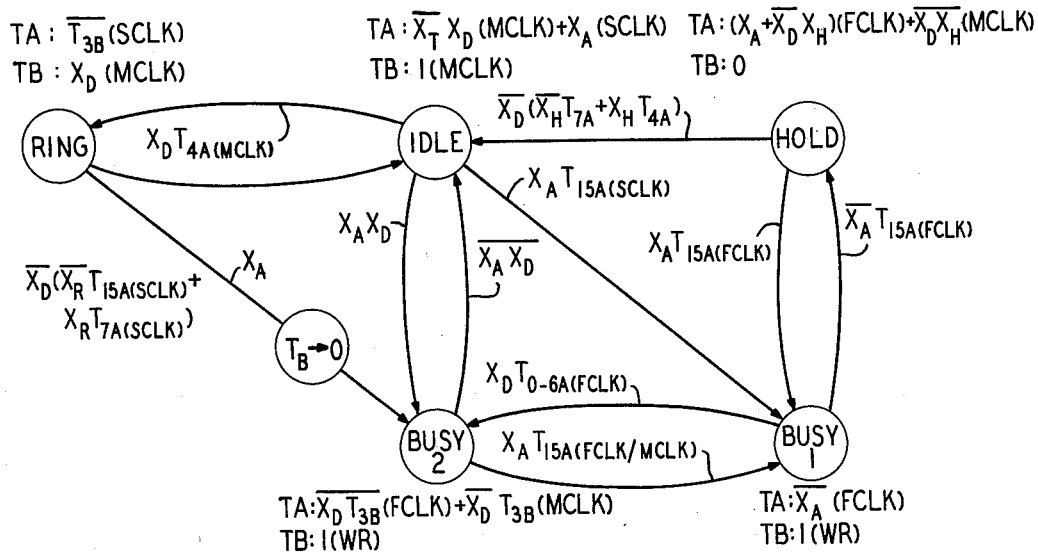
FIG. 4 shows a state diagram of the overall line circuit.

The operation of the line circuit in a key telephone environment is shown in FIG. 17. Overall system operation and cooperation with the stations and with the CO or PBX is well known and will not be repeated herein. For an example of each overall operation see U.S. Pat. No. 3,436,488 issued to R. E. Barbato, et al on Apr. 1, 1969 and see the aforementioned Angner et al patent. Before proceeding with a detailed discussion of the circuit operation of our invention a brief description of the various states of the machine will be provided. These states are illustrated in FIG. 4 which shows a state diagram of the overall line circuit. This Figure as well as the other Figures will be discussed in more detail after the following discussion of the circuit states and the transition associated with each state.

IDLE State

Figure 1:
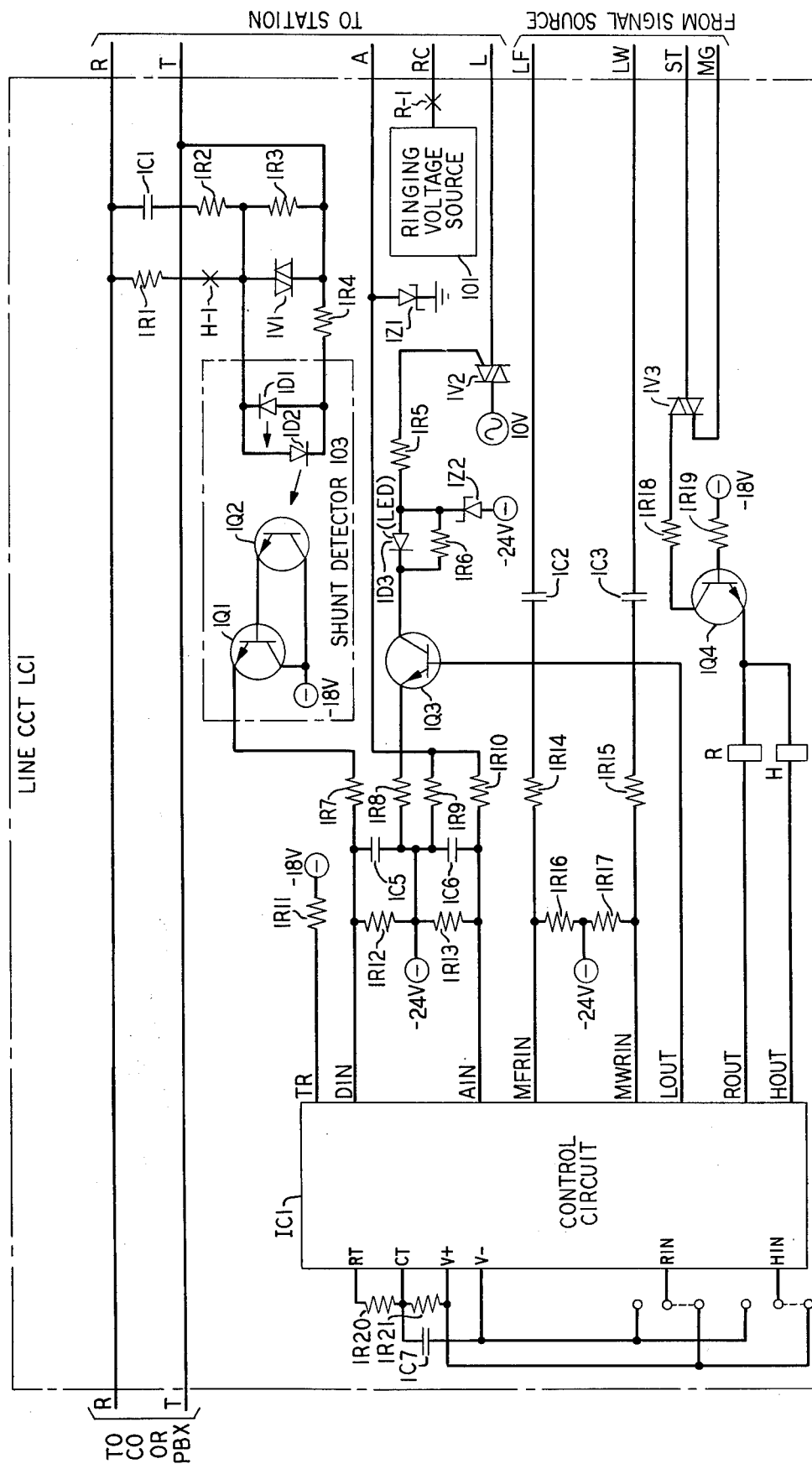
FIG. 1 shows a schematic diagram of our new key telephone line circuit.
Figure 2:
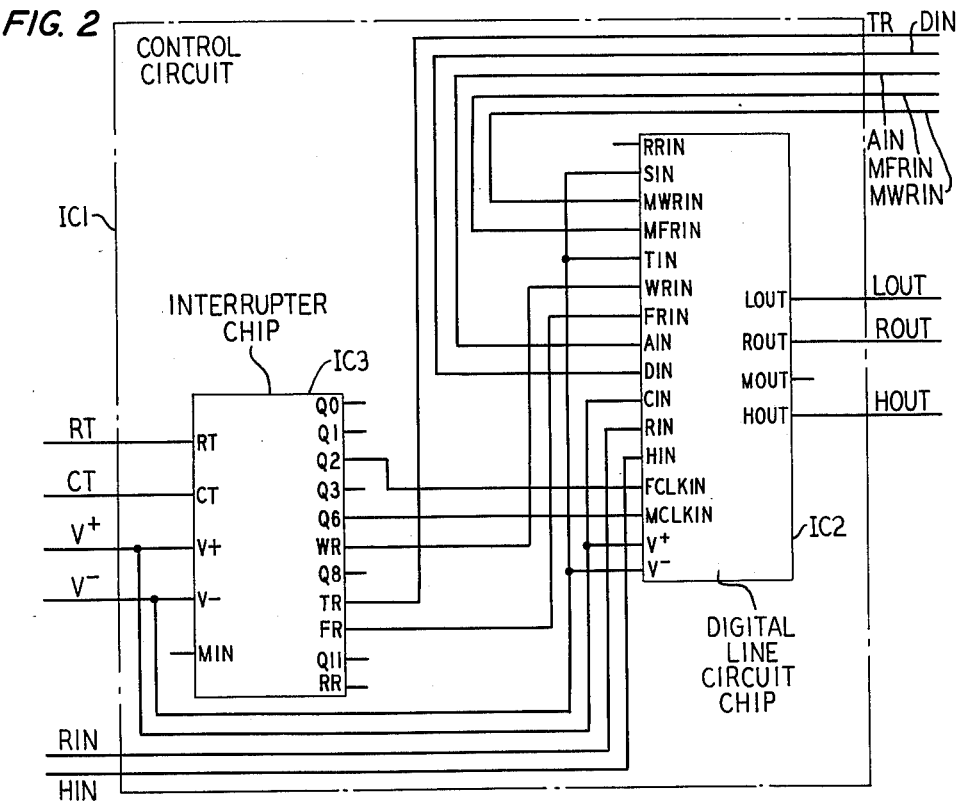
FIG. 2 shows a block diagram of the major integrated circuit chips used to control the line circuit.
Figure 3:
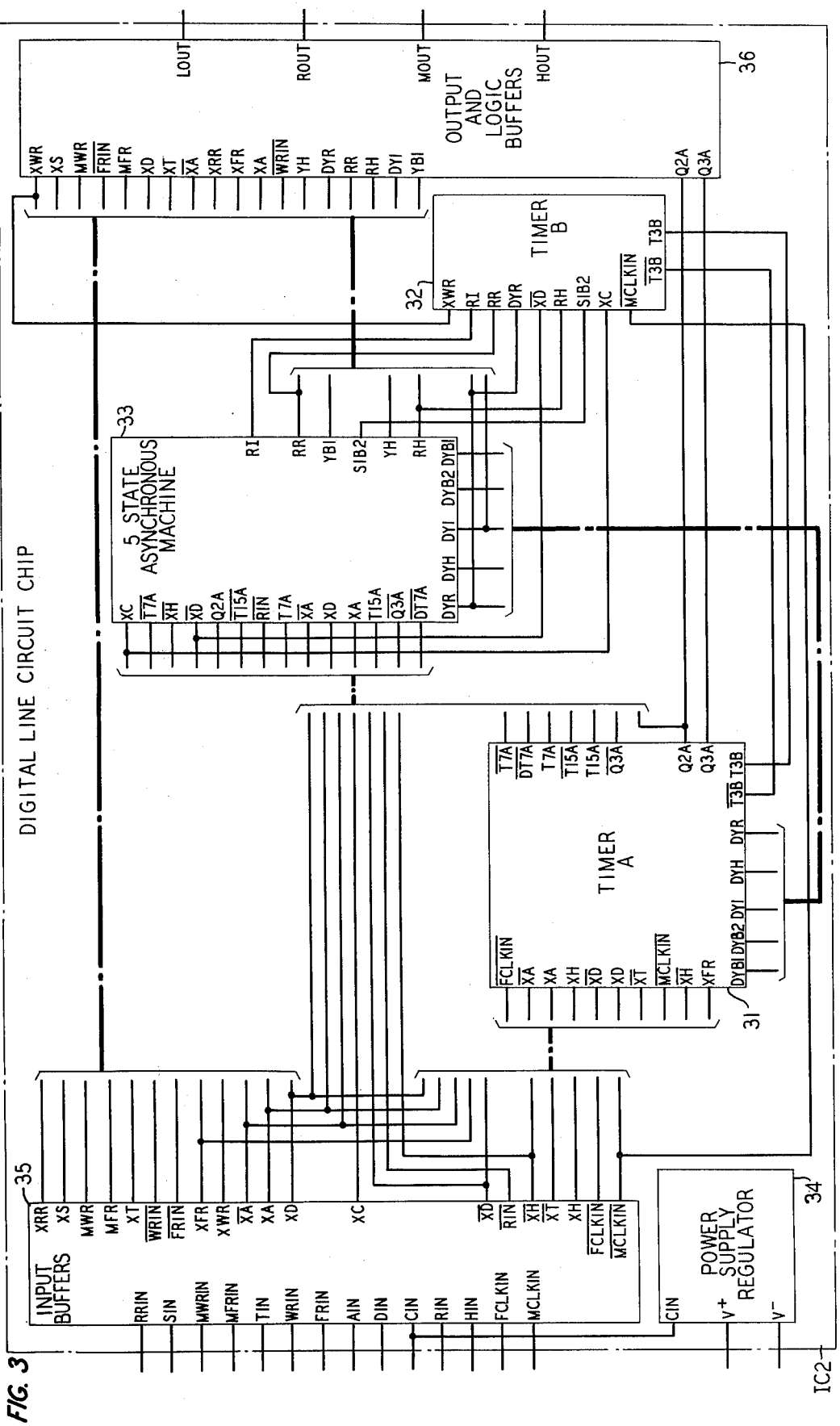
FIG. 3 shows a block diagram of the digital line circuit integrated circuit.
Figure 9:
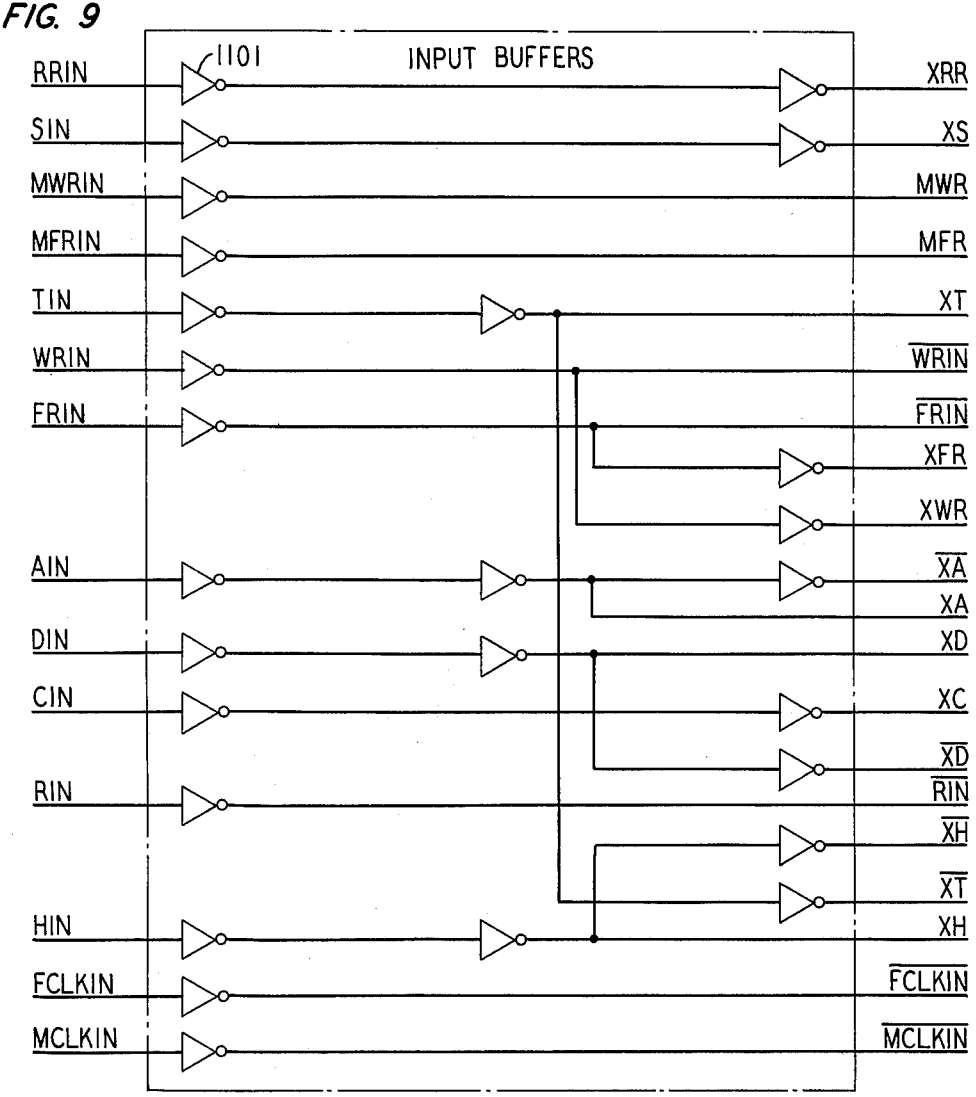
FIGS. 9 through 15 show details of the gate circuitry of the line circuit control circuits.

As shown with reference to FIGS. 1, 2, and 3 the machine is in the IDLE (I) state when no station is off-hook (OFH) and there is no incoming signal on the tip and ring leads. If an incoming signal is received from the CO or PBX, a signal is provided via ring-up capacitor 1C1 and resistors 1R2 and 1R3 causing light emitting diodes 1D1 and 1D2 to illuminate light detecting transistors 1Q1 and 1Q2 causing a signal on lead DIN of control circuit IC1. This signal becomes a high on the $X_D$ input (FIG. 3), and the circuit transfers to the RING (R) state if the $X_D$ high input is present for more than 170–280 ms. If the A-lead from the station goes to ground a signal is provided to the AIN input to circuit IC1 causing lead $X_A$ (FIG. 3) to go high. If both the $X_A$ and $X_D$ inputs go high, the machine transfers to the BUSY 2 (B2) state. This is the true off-hook transition. If the A-lead is grounded for more than 12.7–16.7 sec, the machine transfers to the BUSY 1(B1) state. This is to allow for the case where the line circuit operates in conjunction with equipment where the discharge of the ring-up capacitor is accidentally masked by the other equipment. In this situation, the line lamp is lit steadily as soon as the A-lead is seized.

RING State

The machine is in the RING (R) state if a legitimate ringing signal is present on the tip and ring leads or the machine is timing over the silent interval in the ringing cycle. In this state the R relay is operated. If the ringing input is removed for more than 5.4–7.8 sec (or optionally 12.7–16.7 sec), indicating that the calling party hs disconnected, the machine returns to the IDLE (I) state. However, if the A-lead is grounded while the machine is in the R state, it will transfer to the B2 state. Lamp flash and audible signals are applied to the station when the machine is in the R state. The lamp signals are controlled by control signals on the LOUT lead from control circuit IC1 and audible signals are controlled by enabled make contact R-1.

BUSY 1 and BUSY 2 States

The BUSY 1 (B1) and BUSY 2 (B2) states together correspond to the BUSY state of the line. This occurs when the A-lead is grounded. The B2 state is required to solve a problem known as a "slow switchhook depression." This problem stems from the fact that if the switchhook is depressed abnormally slow, the ring-up capacitor charge is sensed by the optical isolator, and then some relatively long time later, the A-lead current stops. Unless provisions are made to record this capacitor charge up, the machine would interpret this as a HOLD indication because the $X_D$ input is not "remembered". This problem is solved by using the B1 state as the normal BUSY state. When a disconnect sequence is begun by reception of the $X_D$ input, the $X_D$ input is recorded and the machine immediately goes to the B2 state. The presence of the $X_A$ input in the B2 state starts a timing interval. If the $X_A$ input is removed in less than 0.8 sec, the machine returns to the I state. However, if the $X_A$ input remains beyond 1.0 sec the machine goes to the B1 state and then goes to false HOLD when the $X_A$ input is finally removed.

The BUSY 2 to BUSY 1 transition timing interval is reduced from a maximum of 1.0 sec to 65 ms when the machine goes into state B2 from the R state. This allows the subscriber to place an incoming call on HOLD 65 ms after answering the call. Similarly, if the machine is in the HOLD (H) state and the line is reseized, the machine will go to the BUSY 1 state and immediately to the BUSY 2 state. This happens because the machine transfers to the BUSY 1 state before the hold bridge (and hence the $X_D$ input) is removed. Here again, the timing interval is reduced to 65 ms so that the line can be reheld quickly.

If the machine is in the BUSY 1 state and the $X_A$ input is removed, it will transfer to the HOLD state after a delay of 50–65 ms. This delay allows for switchhook contact skew.

A steady lamp indication is given when the machine is in the B1 or B2 state.

HOLD State

The machine is in the HOLD (H) state when the CO/PBX line is being held. In this state the H relay is operated placing a hold bridge, consisting of resistors 1R1, 1R3 and 1R4, diodes 1D1 and 1D2 and varistor 1V1 across the CO/PBX leads via enabled make contact H-1. Lamp wink is applied to the line lamp under control of lead LOUT from control circuit IC1. If the line is reseized, implying that the $X_A$ input goes high, the machine returns to the B1 state after a nominal 55 ms delay. This delay is simply for noise protection.

The machine returns to the I state when current ceases to flow through the hold bridge as detected by shunt detector 103. Two optional timing intervals are employed to bridge both central office reswitch open conditions and noise on the CO/PBX line. The short time interval is used when the line circuit operates with a mechanical central office, such as step-by-step or crossbar not having permanent signal trunks. The short time option bridges an open of 15 ms and disconnects an open of 340 ms and disconnects an open of 525 ms and is intended for use with ESS and all offices equipped with permanent signal trunks.

Discussion of System Operation (FIGS. 1, 3, 4 and 17)

At this point a basic description of activity within the key telephone line circuit will be given. A more detailed account of state and timer control will be presented when actual sequences are described. Five states, namely the IDLE (I), RING (R), HOLD (H), and BUSY 1 and BUSY 2 (B1 and B2) states, are required in the sequential machine to properly interpret the chip input signals and generate the appropriate output signals. For the moment consider the BUSY 1 and BUSY 2 states to be a single BUSY state. The resulting state diagram (FIG. 4) has all the state transition paths that can be expected in a CO/PBX line circuit.

If a station, such as station S1, FIG. 17, goes off-hook while in any state, a timed or untimed transition is made by line circuit LC1 to the BUSY state. The transition from RING to BUSY is not timed. There are two possible transitions from IDLE to BUSY. Going off-hook via a pickup key such as pickup key 1PUK and switchhook SW causes the A-lead to be grounded and the station network 1301 to be connected across the T and R leads of the CO/PBX line, in that order. Normally this offhook sequence involves Lead AIN (FIG. 1) going high followed by a pulse on Lead DIN (FIG. 1) generated by the large change in voltage across the T and R leads from the station as detected by shunt detector 103. Line circuit LC1 normally makes the IDLE to BUSY transition during the pulse on Lead DIN but if line conditions should prevent the voltage transient from being sufficiently large to produce a pulse on Lead DIN, a timed transition will take the circuit from IDLE to BUSY 14.5 seconds after the A-lead is grounded.

The circuit resides in the IDLE state when the line is inactive. As shown in FIG. 1 when CO or PBX ringing is applied to the line, it is detected by shunt detector 103 causing a signal on lead DIB and ring-up delay timing is performed in the IDLE state. After approximately 220 milliseconds, a transition to the RING state occurs. Ring abandon timing is performed in the RING state during the absence of CO/PBX ringing. The RIN input provides the option of short $(+v)$ or long $(-v)$ tim-out intervals of 6.5 or 14.5 seconds. If the call is not answered or ringing is terminated, a transition back to IDLE occurs at the end of the ring abandon time-out interval.

The line circuit enters the HOLD state from the BUSY state through a timed transition 55 milliseconds after the hold key is depressed, opening the A-lead. The hold bridge relay is energized 12 milliseconds before the HOLD state is entered so that $X_D$ will be asserted upon entering the state. Hold abandon timing is accomplished in the HOLD state when CO battery is interrupted. The HIN input provides a choice of short $(+v)$ or long $(-v)$ time-out intervals of 30 or 430 milliseconds nominally, which commence when lead DIN goes low.

The need for the IDLE, RING and HOLD states is obvious but the necessity for two BUSY states is less apparent. Note that the circuit must be in the BUSY 1 state to make a transition to HOLD and in the BUSY 2 to make a transition to IDLE. In essence, most of the circuit complexity is involved in assuring that the circuit is in the particular BUSY state which will generate the correct state transition out of the BUSY state when the user operates the station keys or switchhook.

A disconnect and a hold key depression are distinguished by the order in which the A-lead and the tip and ring are opened at the station. When a disconnect is initiated at the station by depressing the switchhook or releasing the pickup key, tip and ring is opened before the A-lead is opened. When the hold key is depressed, however, the A-lead is opened, but the pickup key remains depressed until the hold key is released, at which time the pickup key is released and the top and ring circuit is opened. The time intervals between A-lead and tip and ring opens are highly dependent on the habits of the user. The large variations in these times and the lack of a steady state indication of line current flow through the station network has necessitated the complexity of the two BUSY states. The only indication of the opening of tip and ring is a pulse on $X_D$ generated by the shunt line detector at the DIn chip input.

The basic strategy used to distinguish a disconnect from the operation of the hold key involves monitoring the DIN input for an indication of the station tip and ring circuit being open-circuited while the line circuit is in the BUSY 1 state. If a pulse is detected at the DIN input, the circuit records this event by making a transition to the BUSY 2 state where it waits for a predetermined length of time, "looking" for the A-lead to be opened which will generate a transition to IDLE. If AIN remains high during the entire timing interval, the pulse is assumed to have been caused by noise transients on the line and the circuit returns to the BUSY 1 state at the end of the interval. In order to go to the HOLD state, the circuit must be in the BUSY 1 state when the hold key is depressed. When the A-lead is opened the circuit times for 55 milliseconds and makes a transition to the HOLD state. Due to the obvious importance of being in the correct BUSY state when the switchhook or hold key is depressed, the length of time that the circuit resides in the BUSY 2 state must be carefully controlled. This time is normally 900 milliseconds, long enough to allow proper response to all but maliciously slow switchhook depressions. There is a high probability, however, that certain users will almost immediately make a transition to HOLD when the BUSY state is entered from the RING or HOLD states. To insure reliable operation under these conditions, the wait time in BUSY 2 is reduced to 55 milliseconds for the first 1.2 seconds after the transition from RING or HOLD to BUSY occurs.

Detailed Description

One important objective in the design of the line circuit is the implementation of the line circuit functions in integrated circuit logic whereever practical in oder to realize the advantages inherent in LSI devices. The two LSI chips used in the line circuit will now be briefly described. These chips are shown in FIG. 2.

Digital Line Circuit Chip — Overview

Digital line circuit chip IC2, shown in expanded form in FIG. 3, is a 140 gate circuit and is the heart of the digital line circuit; it contains a 5-state asynchronous sequential machine 33 and digital timers 31 and 32 which generate the appropriate signals at the four outputs in response to signals present on the 14 inputs. The HOUT, ROUT, LOUT and MOUT output buffers are tailored to the switching circuits or busses they drive and the input buffers are designed to minimize the external interface circuitry required. Simple R-C circuits couple the A-lead and shunt line detector output to the AIN and DIN inputs, respectively. The MFRIN and MWRIN inputs are capacitively coupled to the LF and LW outputs from a mechanical interrupter. The RRIN, FRIN, WRIN, MCLKIN and FCLKIN inputs interface with outputs from the interrupter chip IC3 which provides clock signals for the timers and clocking rates for the signaling circuits. The HOLD and RING abandon time-out options and the test line feature are implemented by controlling the logic levels on the HIN, RIN and TIN inputs, respectively. A capacitor connected across the CIN and V− terminals provides circuit initialization to the IDLE state during the application of power and greatly reduces the sensitivity of the circuit to power supply transients. The transient suppression capability and the wide power supply voltage range of 4.5 to 7.0 volts simplifies the design of power supply regulators for the logic circuitry.

Interrupter Chip — Overview

Interrupter chip IC3 shown in FIG. 2 provides WINK, FLASH and RING rates and clock signals for controlling the digital line circuit. These clocking signals are also used as will be more fully detailed hereinafter, to provide tone-on-hold. Five percent timing accuracy is achieved with two one percent resistors and a single two percent capacitor.

Digital Line Circuit Chip — Detailed Discussion

Digital line circuit chip IC2 can be conveniently divided into six blocks as shown in FIG. 3. The heart of the circuit is a 5-state asynchronous sequential machine 33 which is controlled by inputs from input buffer 35 and by timers 31 and 32. The state outputs are fed back to the timers to control counting intervals and rates and are decoded by the output logic circuitry to provide the requires signals at the IC outputs. Power supply regulator 34 provides the correct operating voltages for the buffers and internal integrated injection logic [I²L] logic circuitry.

Figure 13:
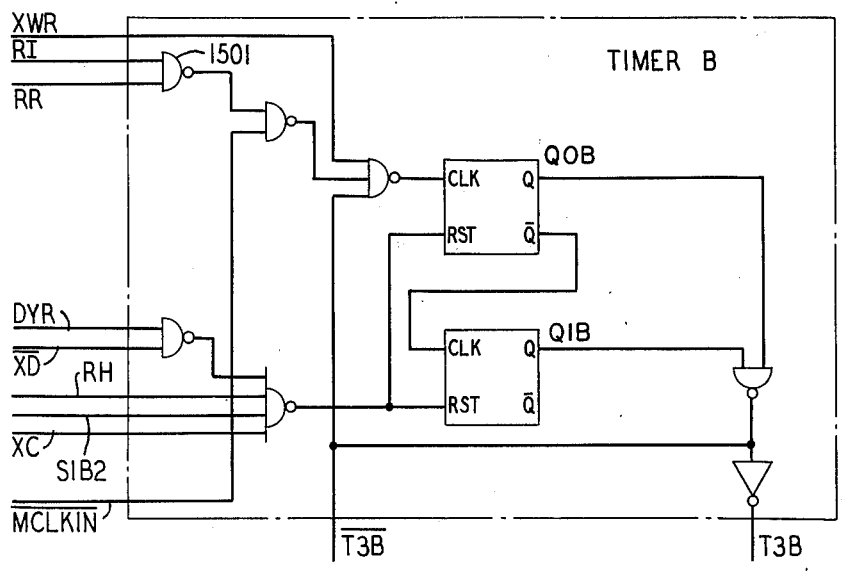
Figure 10:
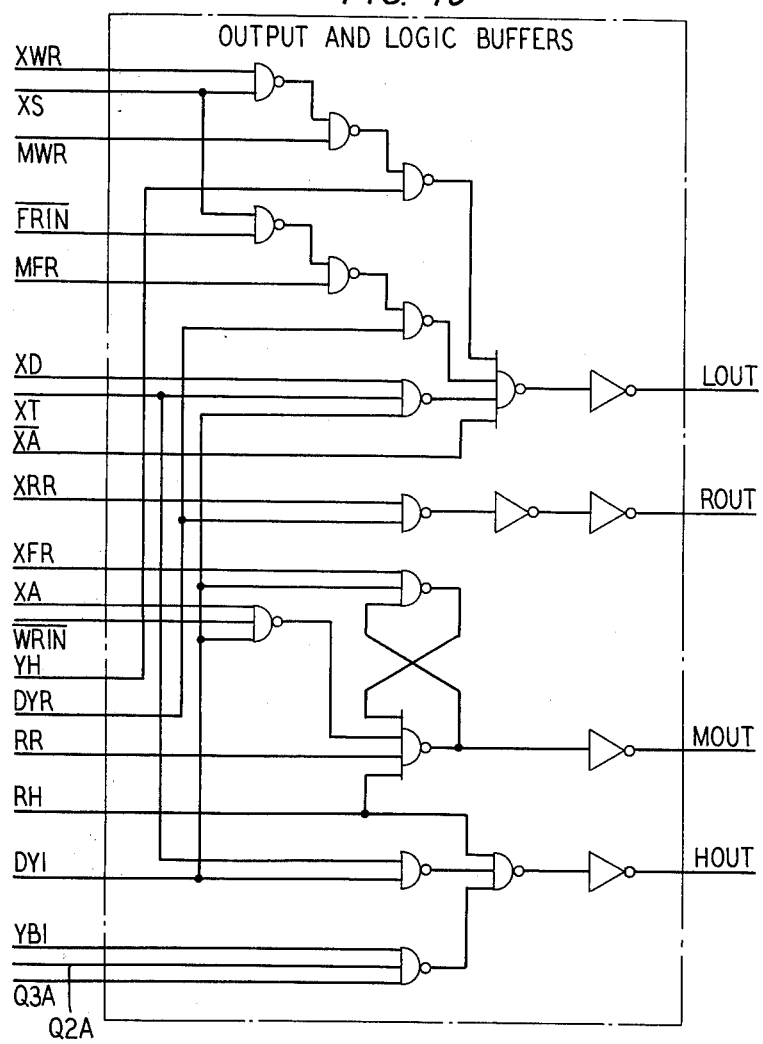
Figure 14:
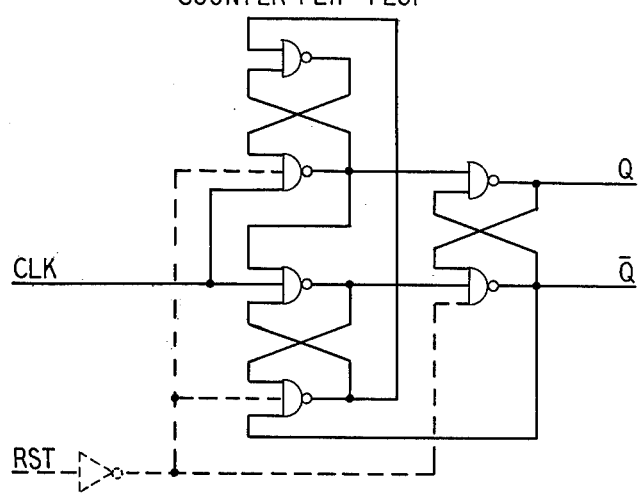
Figure 11:
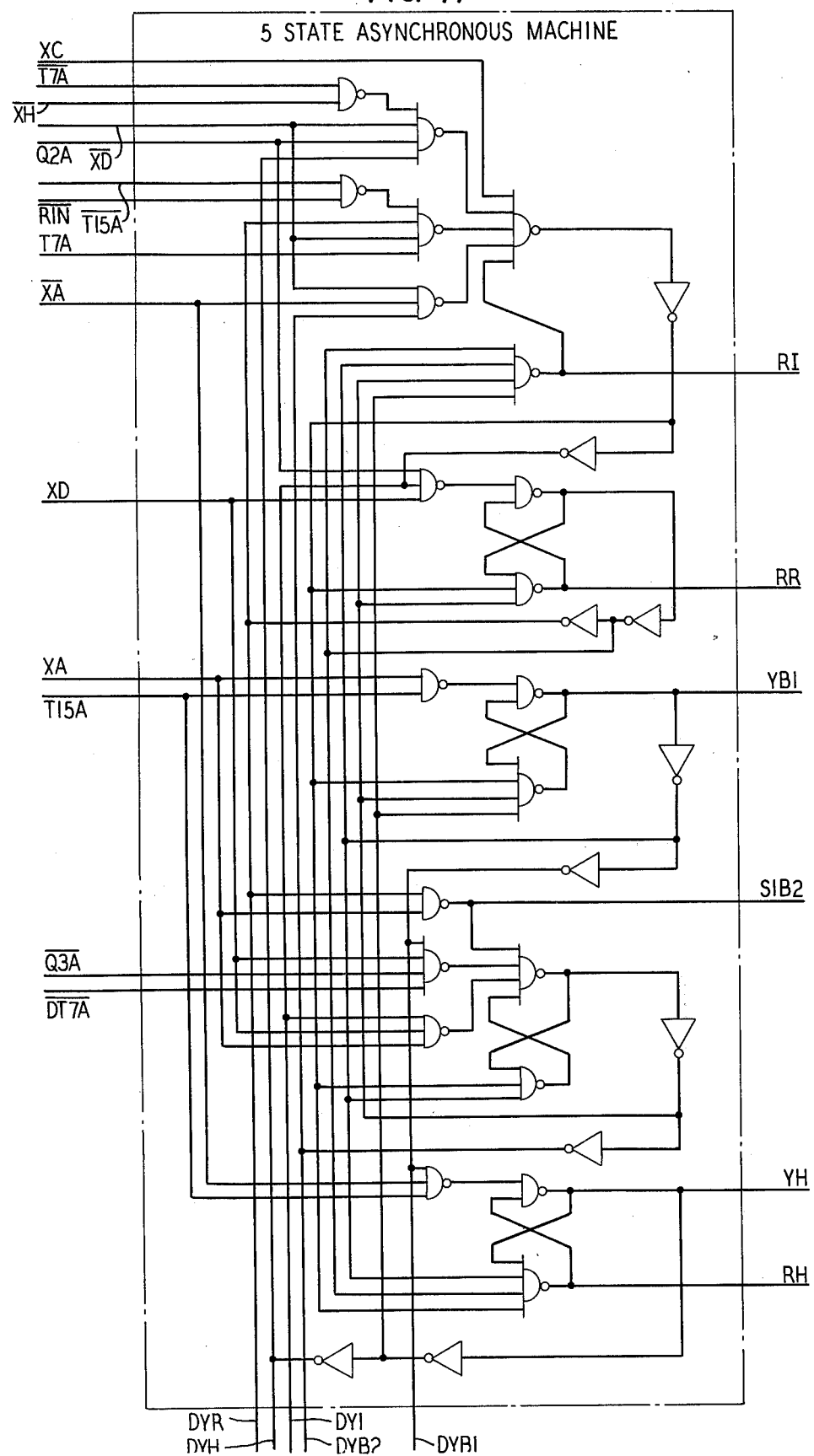
Figure 12:
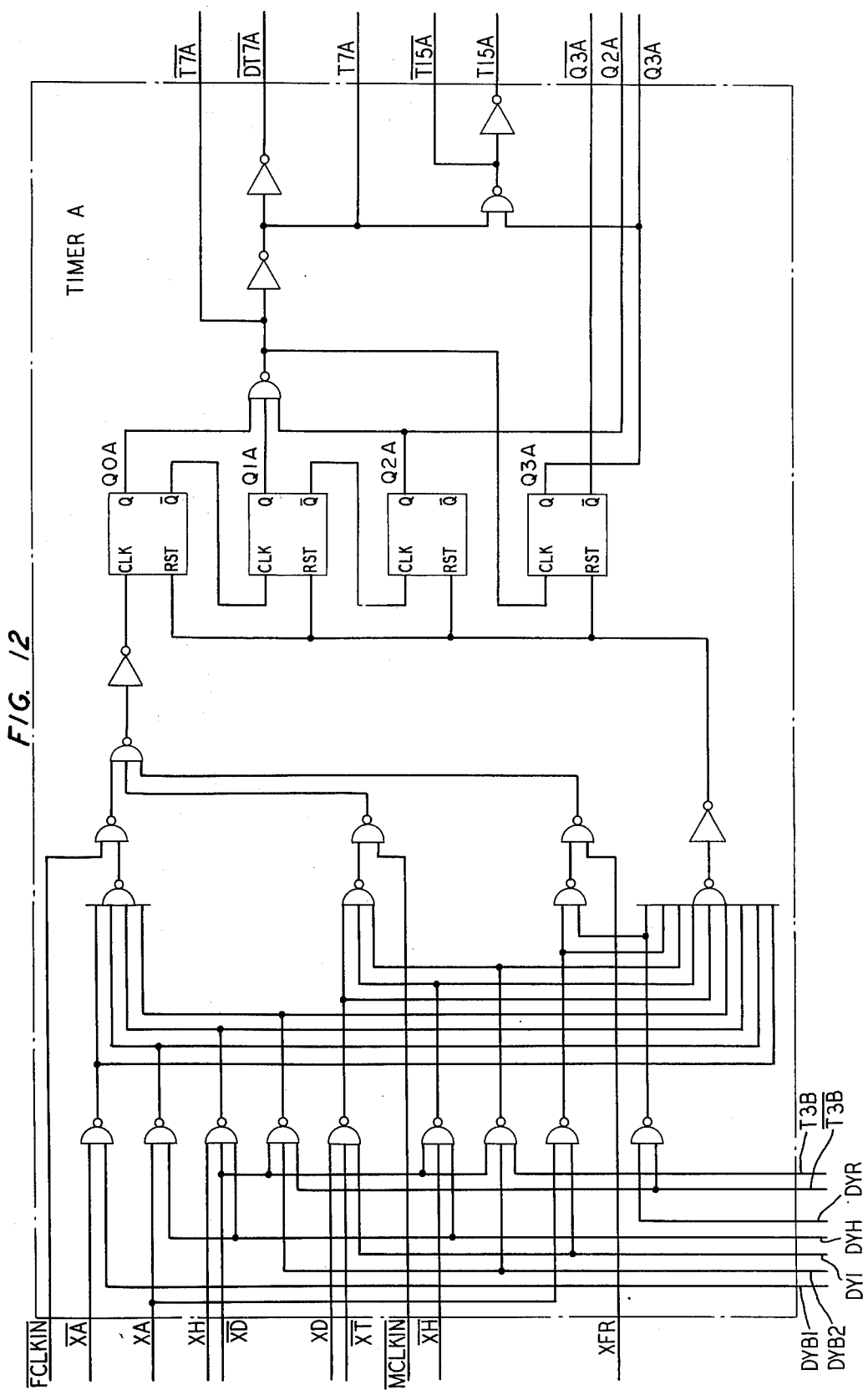
Figure 15:
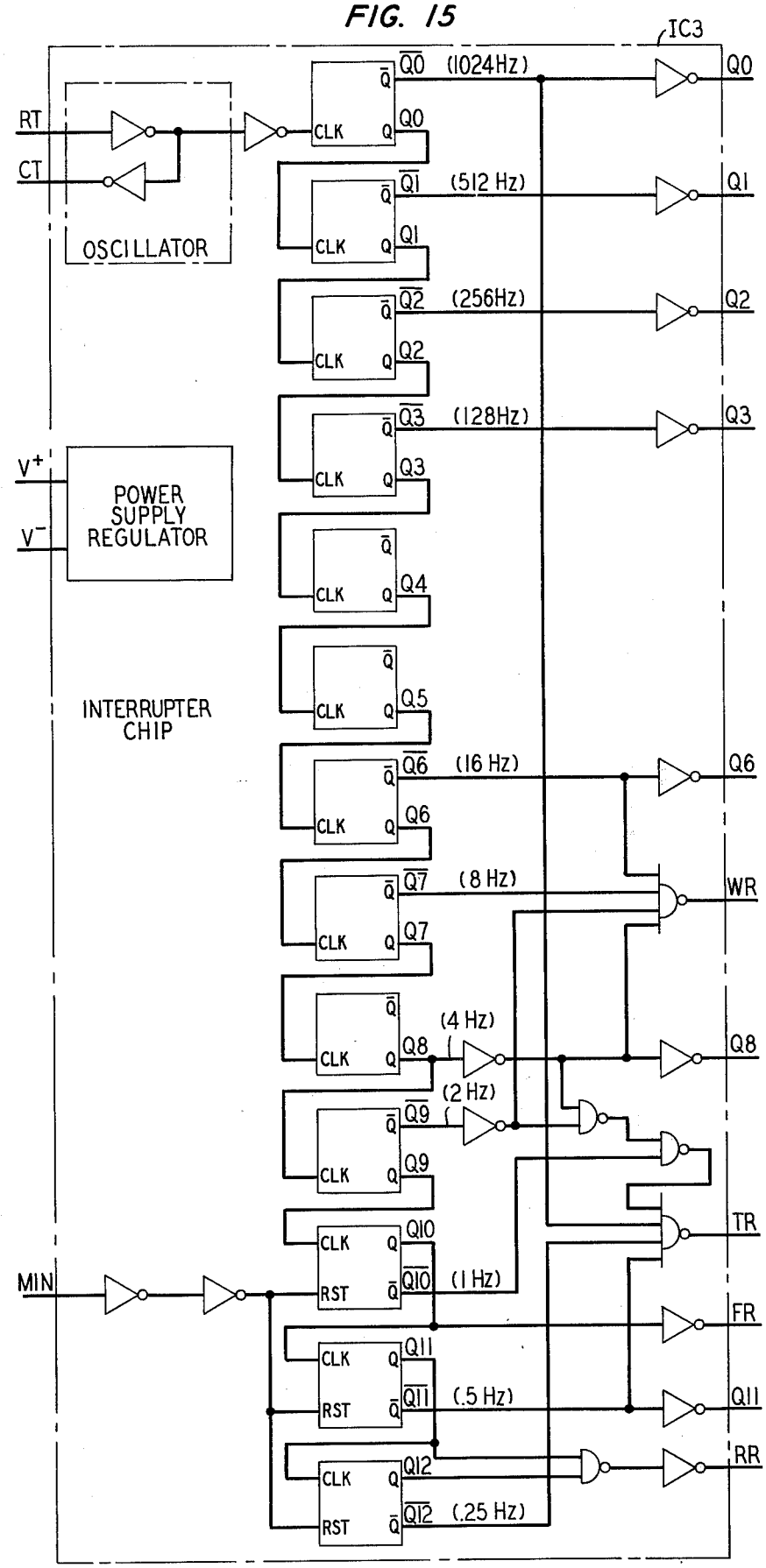
Figure 16:
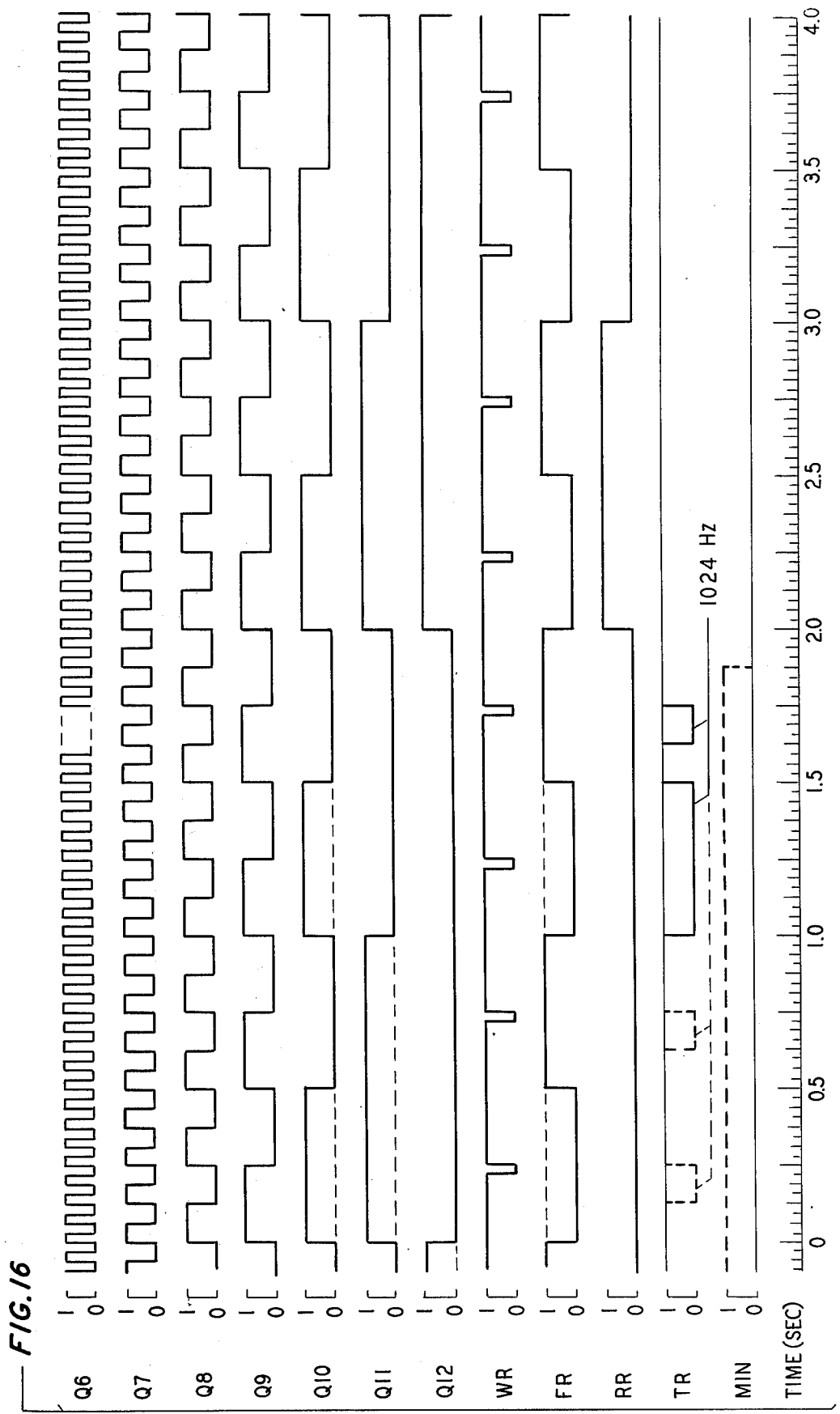

The internal state of the line circuit is completely specified by the states of 12 internal flip-flops, five of which are shown in machine 33. During normal operation, the circuit will assume only a small fraction of the 4,096 possible combinations of flip-flop states. The I, R, B1, B2 and H flip-flops in 5-State Asynchronous Machine 33 and the M flip-flop in Output Logic and Buffer Circuis 36 are simple 2-gate set-reset flip-flops. The Q0A through Q3A bits of Timer 31 (as detailed in FIG. 12) and the Q0B and Q1B bits of Timer 32 (as detailed in FIG. 13) are 6-gate toggle flip-flops which form two binary ripple counters.

Input Buffer 35 is arranged to convert the 14 input signals to I²L compatible levels. Each buffer is designed specifically for the type of signal present at its input and the type of circuitry with which it must interface.

As discussed, the heart of the line circuit chip is 5-State Asynchronous Sequential Machine 33 consisting of 5 R-S flip-flops and the associated set and reset logic.

Signals from the Input Buffers and Timer 31 control the states of the flip-flops. The circuit is designed so that only one flip-flop is set at a time (one-hot coding). Each flip-flop relates directly to a line circuit state: IDLE (I), RING (R), BUSY (B1 and B2) and HOLD (H). The state outputs are decoded by output translation logic and are also fed back to the two timers.

The main timer on the chip, Timer 31 (timer A), contains a 4-bit binary ripple counter and associated enable and clock control circuitry. The state outputs from the 5-State Asynchronous Machine, signals from the Input Buffers, and the output from Timer 32 control when and at what rate Timer 31 counts. Four timer outputs control the state transitions within the 5-State Asynchronous Machine and the HOUT buffer in the Output Logic and Buffers circuitry.

A second 2-bit timer, Timer 32 (timer B), provides auxiliary timing functions in the line circuit. The output of the timer controls activity in Timer 31.

Output logic and Buffers 36 generate chip output signals in response to the internal state of the circuit and the chip inputs. The translation logic for the HOUT, ROUT and LOUT buffers is simple combination circuitry which implements equations to be described below. The control circuitry for the MOUT buffer contains an R-S flip-flop (M) which drives the buffer.

When HOUT is low, the hold bridge relay is energized, connecting the hold bridge across tip and ring. HOUT is pulled low when: (1) the line circuit is in the HOLD state [YH = 1], or (2) the line circuit is in the BUSY 1 state while Timer 31 is between counts of 12 and 15, inclusive [YB1.Q3A.Q2A = 1], or (3) the line circuit is in the IDLE state and TIN is asserted to test for the presence of CO battery [YI.XT = 1]. Expressed mathematically:

$$\overline{HOUT} = YH + YB1.Q3A.Q2A + YI.XT \quad (1)$$

The ring relay is energized when ROUT is low, switching the alerting signal to the signaling device in the station. ROUT is pulled low when the line circuit is in the RING state and RRIN is high, as expresed below:

$$\overline{ROUT} = YR.XRR \quad (2)$$

The lamp switch is turned on when LOUT is driven high. The station lamp and the LED indicator in the line circuit are illuminated steadily when: (1) the A-lead is grounded [XA = 1], or (2) a CO line test initiated while the circuit is in the IDLE state detects the presence of CO battery [YI.XD.XT = 1]. During the line test, the hold bridge is connected across tip and ring and if CO battery is present, current flows through shunt detector 103 (FIG. 1) asserting DIN. LOUT generates the lamp flash signal when the line circuit is in the RING state [YR = 1]. When SIN is left open (logical 1), MFRIN is also left open and the lamp follows FRIN; and when SIN is connected to V− (logical 0), the flash rate is derived from the MFRIN input.

LOUT generates the lamp wink signal when the line circuit is in the HOLD state [YH = 1]. When SIN is left open, MWRIN is also left open and the lamp follows WRIN; and when SIN is connected to V−, the wink rate is derived from the MWRIN input. The operation of the LOUT buffer can be expressed as follows:

$$LOUT = XA + YI.YD.XT + YR.(XS.\overline{XFR} + MFR) + YH.(XS.\overline{XWR} + MWR) \quad (3)$$

The MOUT buffer is an open collector output which can be OR-tied with the MOUT buffers of other line circuits associated with a single interrupter IS to form a bus. The MOUT buffer of any line circuit can pull the bus low, causing interrupter IC3 (FIG. 2) to generate the flash rate, ring rate, and tone-on-hold signals. These signals are required when the line circuit is in the HOLD [YH = 1] and RING [YR = 1] states and when conditions for a timed IDLE to BUSY 1 transition exist [YI.XA.$\overline{XWR}$ = 1]. The motivation for including a flip-flop in the MOUT circuit stems from the timed IDLE to BUSY 1 transition which requires that the flash rate signal from interrupter IC3 (connected to FRIN) be active, which is only true if the MOUT bus is pulled low. Operation of the M flip-flop will be discussed after the state diagram is reviewed and the operation of interrupter IC3 is explained. For completeness, the equations specifying the control of the MOUT buffer are given below:

$$\overline{MOUT} = YM \quad (4)$$

M: SET by YH + YR + YI.XA.XWR RESET by
$\overline{YI}$ + $\overline{XFR}$ (SET overrides RESET) \quad (5)

Power Supply Regulator

Power supply regulator 34 has two principal functions: (1) to develop a supply voltage equal to three diode voltage drops to power the internal I²L circuitry and some of the buffer circuits; and (2) to utilize the charge stored in a capacitor connected across CIN and V— to filter noise transients on V+. A pull-up resistor from CIN to V+ keeps the capacitor normally charged to the average power supply voltage. During momentary dips in the V+ voltage, the capacitor supplies energy to the circuit.

All of the logic signals in the circuit have been given mnemonic names so that they can be easily identified. Descriptions of the signals are given below to aid in understanding the sections that follow. The following conventions have been used:

1. Positive-true logic is assumed (Logical 1 = True = High = V+, Logical 0 = False = Low = V—);
2. Gates are identified by the logic signals which they generate at their outputs; and
3. All internal signals are represented in their true form even though signaling between blocks may be accomplished with their complements or time delayed equivalents.

| Digital Line Circuit IC2 Chip Signals (FIGS. 1 and 3) | |
|---|---|
| AIN- | A Lead Input |
| CIN- | Initialization Capacitor Input |
| DIN- | Shunt Detector Input |
| FCLKIN- | Fast Clock Input (1024 Hz) |
| FRIN- | Flash Rate Input |
| HIN- | Hold Abandon Time-out Option Input |
| MCLKIN- | Medium Clock Input (16 Hz) |
| MFRIN- | Mechanical Interrupter Flash Rate Input |
| MWRIN- | Mechanical Interrupter Wink Rate Input |
| RIN- | Ring Abandon Time-out Option Input |
| RRIN- | Ring Rate Input |
| SIN- | Select Lamp Signal Input |
| TIN- | Test Line Input |
| V+- | Positive Voltage (+) Supply |
| V—- | Negative Voltage (—) Supply |
| WRIN- | Wink Rate Input (0.5 Hz) |
| HOUT- | Operate Hold Bridge Relay Output |
| LOUT- | Lamp Switch Output |
| MOUT- | Motor Start Output |
| ROUT- | Ring Control Output |
| Input Buffer 35 Signals (FIG. 3) | |
| $\overline{\text{FCLKIN}}$- | $\overline{\text{FCLKIN}}$ is the logical complement of FCLKIN. |
| $\overline{\text{MCLKIN}}$- | $\overline{\text{MCLKIN}}$ is the logical complement of MCLKIN. |
| MFR- | When no signal is present at the MFRIN input MFR = 1. When an ac signal is present at MFRIN, MFR is pulsed low at a rate twice that of the ac input signal. |
| MWR- | When no signal is present at the MWRIN input, MWR = 1. When an ac signal is present at MWRIN, MWR is pulsed low at a rate twice that of the ac input signal. |
| XA- | XA is logically equivalent to AIN. |
| XC- | XC is derived from the CIN input. When the voltage at the CIN input is less than the input threshold (approximately 3.5 volts), XC = 0; and when the voltage is greater than the threshold, XC = 1. At the CIN threshold, the internal I²L circuitry and the AIN and DIN input buffers function properly. |
| XD- | XD is logically equivalent to DIN. |
| XFR- | XFR is logically equivalent to FRIN. |
| XH- | XH is logically equivalent to HIN. |
| $\overline{\text{RIN}}$- | $\overline{\text{RIN}}$ is the logical complement of RIN. |
| XRR- | XRR is logically equivalent to RRIN. |
| XS- | XS is logically equivalent to SIN. |
| XT- | XT is logically equivalent to TIN. |
| XWR- | XWR is logically equivalent to WRIN. |

| 5-State Asynchronous Machine 33 Output Signals (FIG. 3) | |
|---|---|
| S1B2- | Set 1 to BUSY 2 State. A negative going pulse occurs on S1B2 when the circuit makes a transition from the RING to BUSY 2 state. |
| YB1- | BUSY 1 State Output. YB1 is the output of the BUSY 1 state flip-flop and is asserted when the circuit is in the BUSY 1 state. |
| YB2- | BUSY 2 State Output. YB2 is the output of the BUSY 2 state flip-flop and is asserted when the circuit is in the BUSY 2 state. |
| YH- | HOLD State Output. YH is the output of the HOLD state flip-flop and is asserted when the circuit is in the HOLD state. |
| YI- | IDLE State Output. YI is the output of the IDLE state flip-flop and is asserted when the circuit is in the IDLE state. |
| YR- | RING State Output. YR is the output of the RING state flip-flop and is asserted when the circuit is in the RING state. |

| Timer 31 Output Signals (FIGS. 3 and 12) | |
|---|---|
| Q0A- | Q0A is the output of the first bit (LSB) of the counter in Timer A. |
| Q1A- | Q1A is the output of the second bit of the counter in Timer A. |
| Q2A- | Q2A is the output of the third bit of the counter in Timer A. |
| Q3A- | Q3A is the output of the fourth bit (MSB) of the counter in Timer A. |
| T7A- | T7A is asserted when the counter in Timer A has counted to decimal 7 in binary. |
| T15A- | T15A is asserted when the counter in Timer A has counted to decimal 15 in binary. |

| Timer 32 Output Signals (FIGS. 3 and 12) | |
|---|---|
| Q0B- | Q0B is the output of the first bit (LSB) of the counter in Timer B. |
| Q1B- | Q1B is the output of the second bit (MSB) of the counter in Timer B. |
| T3B- | T3B is asserted when the counter in Timer B has counted to decimal 3 in binary. |

| Interrupter Chip Signals IC3 (FIG. 2) | |
|---|---|
| CT- | Capacitor Timing Input for on-chip oscillator. |
| V+- | Positive Voltage (±) Supply. |
| V—- | Negative Voltage (—) Supply. |

Chip Output Signals

All chip outputs are low-power open collector outputs with 6 kilohm pull-up resistors to V+ except for the TR output which has a clamping diode to V+. The frequencies given below assume a timing source frequency of 2048 Hertz.

FR — Flash Rate Output. FR buffers a 1 Hertz square-wave signal intended to be used for the lamp flash rate. The signal is present when MIN = 0. The lamp should be illuminated when FR = 0.

Q0 — Q0 Output. Q0 buffers a 1024 Hertz square-wave signal.

Q1 — Q1 Output. Q1 buffers a 512 Hertz square-wave signal.

Q2 — Q2 Output. Q2 buffers a 256 Hertz square-wave signal.

Q3 — Q3 Output. Q3 buffers a 128 Hertz square-wave signal.

Q6 — Q6 Output. Q6 buffers a 16 Hertz square-wave signal.

Q8 — Q8 Output. Q8 buffers a 4 Hertz square-wave signal.

Q11 — Q11 Output. Q11 buffers a 0.5 Hertz square-wave signal which is generated when MIN = 0.

RR — Ring Rate Output. RR buffers a 0.25 Hertz signal intended to be used for the ring rate. The signal is present when MIN = 0. The ring should be energized when RR = 1 (25 percent of the cycle).

TR — Tone Rate Output. TR buffers a 1024 Hertz signal switched at the tone-on-hold rate. The signal has the correct rate when MIN = 0.

WR — Wink Rate Output. WR buffers a 2 Hertz signal intended to be used for the lamp wink rate. The lamp should be illuminated when WR = 1 (93.75 percent of the cycle).

State diagram (FIG. 4)

The operation of digitial line circuit chip IC2 can be understood more easily by reviewing the transitions shown in FIG. 4 between the IDLE (I), RING (R), BUSY 1 (B1), BUSY 2 (B2) and HOLD (H) states. The state transitions are driven by the chip inputs and timer outputs as shown in FIG. 4. The notation used in the state diagram and the characteristics of the timers are explained below. A description of the state transitions and timer control follows the explanation:

Notation

Inputs — The chip inputs are denoted $X_i$ where the mneomonic given to the chip input is iIN. $X_A$, for example, is logically equivalent to AIN and is asserted when the station A-lead is grounded; and $X_D$ is equivalent to DIN and is asserted when current flows in shunt line detector 103 (FIG. 1).

Timer 31 — Timer 31 (TA) contains a 4-bit binary counter which counts at one of three selected rates (SCLK, MCLK or FCLK) when it is enabled and is reset to zero when it is not enabled. An expression of the form TA: [expression 1] )FCLK) + [expression 2] (MCLK) + [expression 3] (SCLK)

is associated with each state. If any one of the three logic expressions is true Timer 31 is enabled and it counts at the rate in parentheses after the expression. For any state, the three expressions are mutually exclusive so that only one clock rate will be enabled at one time. If an expression is always false, it is omitted from the equation in the state diagram. If one of the conditions necessary for a state transition is that Timer 31 has reached a certain count, then a term of the form $T_{iA}$ is included in the logic expression for the transition, where $i$ is a decimal number which represents the binary count of Timer 31 for which the teerm is true. As an example, consider the activity of Timer 31 in the IDLE state. If AIN goes to logical 1 ($X_A = 1$), Timer 31 will be enabled and count at the SCLK rate. When a count of 15 is reached, a transition from IDLE to BUSY 1 will occur. Alternatively, if DIN should go to logical 1 while TIN remains low ($\overline{X_{TDD}} = 1$), Timer 31 will be enabled and count at the MCLK rate. At the count of 4, the circuit will go to the RING state. Note that the timer cannot be enabled for both MCLK and SCLK simultaneously. If both $X_A = 1$ and $X_D = 1$, a transition would immediately occur from the IDLE to BUSY 2 states.

Timer 32. Timer 32 (TB) contains a 2-bit binary counter which counts at one of two selected rates (WR or MCLK) when it is enabled and is reset to zero when not enabled. When the timer reaches a count of 3 it locks up, remaining at that count until it is reset to zero. Three events will reset the counter to zero: (1) a false [logical 0] enable signal [as previously mentioned]; (2) a transition from RING to BUSY 2 [note the transition vector in the state diagram]; or (3) $X_C = 0$ [when CIN = 0 during circuit initialization when power is applied]. An expression of the form TB: [expression 1] (MCLK) + [expression 2] (WR) is associated with each state. If either logic expression is true, Timer 32 is enabled and it counts at the rate in parentheses after the expression until a count of 3 is reached, at which point the counter locks up. Timer 32 does not directly control any state transitions, but it does determine activity in Timer 31. Consequently, the term $T_{3B}$, which is true when Timer 32 has reached a count of 3, is included in the expressions which specify the control of Timer 31 in some of the states. Timer activity in the RING state affords a good example of the control of Timer 32 and its effect on Timer 31. Timer 31 normally counts SCLK ($T_{3B} = 0$) when the circuit is in the RING state. When DIN goes high ($X_D = 1$), Timer 32 is enabled to count MCLK. When Timer 32 locks up at a count of 3 ($T_{3B} = 1$), Timer 31 loses its enable and resets itself as long as DIN remains high. Control of Timer 32 is much more straightforward in the other states. It is always held reset in the HOLD state. In the IDLE state it is always enabled with MCLK providing the clock rate, and in the BUSY 1 and BUSY 2 states, it is always enabled with WR. Note that in BUSY 2, Timer 32 controls the clock rate used by Timer 31 when it i s enabled.

Due to internal timing neither timer will be reset during state transitions if the conditions necessary to enable it exist in both states involved in the transition. Timer 32, for example, will not be reset during transitions between IDLE, BUSY 2, and BUSY 1. Where it is important that a timer be reset when it enters a state, care has been taken to insure that the conditions required to enable the timer do not exist simultaneously in both states involved in the transition at the time of the transition. The transition from RING to BUSY 2, however, represents a special case because the conditions necessary to enable Timer 32 can exist in both states at the time of the transition. A special input to Timer 32 from the state machine logic (S1B2 in FIG. 3) resets the timer during this transition as indicated in the state diagram.

The timing diagrams of FIGS. 5 through 8 show the signals on the AIN ($X_A$) and DIN ($X_D$) inputs, the activity of the two timers 31 and 32 which for convenience in this discussion will be called Timer A (TA) and Timer B (TB), respectively. The timer waveforms indicate whether the respective counter is enabled (logical 1) or reset (logical) 0). Clock "ticks" are also shown along the waveforms when they are at logical 1 to indicate when the timers are incremented. Diagonal "slash" marks appearing at certain time positions indicate points where the time scale could be expanded indefinitely without altering future events because no significant timer activity is occurring at that point in time. All times are given in seconds.

Ring-up and Ring Abandon Timing Sequence: (I - R I)

The first sequence to be considered involves only the IDLE and RING states as shown in FIGS. 4 and 5. At $t = 0$, assume that $X_A = 0$, $X_T = 0$, Timer A is reset, and Timer B is locked up at a count of 3. In order for a transition from IDLE to RING to occur, $X_D$ must go high for at least 4 counts of MCLK. This transition is timed so that the circuit can distinguish between various types of differential noise across the line and true ringing signals. At $t = 0$, a noise transient on the line causes $X_D$ to go high for 150 milliseconds Timer A is enabled but only counts to 2 before it is reset, so the circuit remains in the IDLE state. At $t = 1.0$ seconds, a full second of ringing is applied to the line, causing $X_D$ to go high during that interval of time. After 4 counts of MCLK (nominally 250 milliseconds), the conditions for an IDLE to RING transition are satisfied. Taking into account all timing variations, the line circuit will not ring up on noise generated $X_D$ pulses less than 170 milliseconds, but is guaranteed to recognize ringing signals greater than 280 milliseconds in duration. These two times represent the worst case limits on the ring-up delay time. Note that at the time the IDLE to RING transition occurs, $T_{3B}$ will always be at logical 1 because Timer B also uses MCLK and it would lock up at a count of 3 before Timer A reached a count of 4 even if it was reset just prior to the application of ringing. Consequently, Timer A will always reset itself upon entering the RING state. Timer B remains locked up until the ringing cycle ends, at which time it will reset, allowing Timer A to begin conting SCLK.

Timing is required in the RING state to bridge the silent interval during the ringing cycle. An option is provided to select the length of the ring abandon timing interval via the RIN input. If RIN (FIG. 1) is tied t V+ ($X_R = 1$), only 7 counts of SCLK are required to generate the RING or IDLE transition, and if RIN is tied to V- ($X_R = 0$), 15 counts of SCLK are required to generate the transition. Basically, Timer A begins counting at the end of each ring interval. If another ring interval is detected before the ring abandon interval has been exceeded Timer A will be reset and not begin counting again until the ring interval ends; otherwise, the circuit will return to the IDLE state. Referring back to the timing diagram, Timer A begins counting SCLK at $t = 2.0$ seconds. Another ringing interval begins at 5.0 seconds, causing $X_D$ to go to logical 1. Timer B is enabled and counts MCLK until it locks up ($T_{3B} = 1$), at which time Timer A will be reset. This condition will remain until ringing ends, at which time Timer B will be reset, allowing Timer A to count again. This use of Timer B prevents transient noise on the line from falsely resetting Timer A. This capability is important because some systems generate periodic noise on an idle line which can keep a line circuit in the RING state indefinitely if it is not answered, even though true ringing has ceased. Noise transients which generate pulses on $X_D$ as long as 110 milliseconds will be rejected. A 100 millisecond noise pulse at $t = 9.0$ seconds on the timing diagram does not reset Timer A. Since $X_R = 1$, the circuit returns to the IDLE state at a count of 7 ($t = 13.0$ seconds). If RIN = 1, the ring abandon timing interval can range from 5.4 to 7.8 seconds, and if RIN = 0, the interval is 12.7 to 16.7 seconds.

Pick-up from Ring Sequence: (I — R — B — H — B — I)

The pick-up from ring sequence is the first sequence to be presented which involves the BUSY states, so activity in the BUSY states is best examined before studying the timing diagram. It will be recalled that the BUST 2 and BUSY 1 transition is of particular importance to proper operation of the line circuit. This transition occurs when timer A a reaches a count of 15 and $X_A = 1$. Timer B acts as an auxiliary counter which controls the rate at which Timer A counts. When the BUSY 1 and BUSY 2 states are entered from the HOLD or RING states, respectively, Timer B is initially reset. It is enabled in both BUSY states with WR. While Timer B is counting $8T_{3B} = 0$), any BUSY 2 to BUSY 1 transition will be timed using FCLK when $X_d$ is low. The time interval can range from 50 to 65 milliseconds Provided a state transition does not occur out of the BUSY states, Timer B will count to 3 and lock up in 0.9 to 1.7 seconds after it was reset by the initial transition into one of the BUSY states. Any further BUSY 2 to BUSY 1 transitions will be timed using MCLK and take place 0.8 to 1.0 seconds after $X_D$ goes low. In the IDLE state, Timer B is enabled with MCLK and, thus, is normally locked up at a count of 3; so when either BUSY state is entered from IDLE, $T_{3B} = 1$ and MCLK is always used to clock Timer A when it is enabled in the BUSY 2 state. As discussed before, the reason for controlling the timing interval for the BUSY 2 to BUSY 1 transition is to normally allow a sufficiently long wait in BUSY 2 to prevent false hold from occurring during slow switchhook depressions while at the saime time allowing a user to go to HOLD immediately upon entering a BUSY state from RING or HOLD.

The pick-up from ring sequence as shown in FIGs. 4 and 6 will demonstrate the state transitions and timer activity that occur when an incoming call is answered and put on HOLD immediately. Just prior to $t = 0$, assume that $X_T = 0$, Timer A is reset and Timer B is locked up at a count of 3. At $t = 0$, ringing is applied to the line. The circuit will ring up as previously described. At $t = 1.0$ seconds, the call is answered ($X_A = 1$) causing a transition to the BUSY 2 state during which Timer B receives a reset pulse. The central switching machine generates another switching transient which causes Timer A to be reset for 50 milliseconds Timer A finally starts counting again and when it reaches 15, a transition to BUSY 1 occurs. While the circuit is in the BUSY 1 state and $X_A$ is high, th only timer activity is that of Timer B which continues to count until it locks up.

At $t = 2.0$ seconds, the hold key is depressed, open-circuiting the A-lead ($X_A = 0$). This event causes Timer A to begin counting at the rate of FCLK. Several important events take place as Timer A counts. If a pulse should occur on $X_D$ while Timer A is between counts of 0 and 6, inclusive, a transition from BUSY 1 to BUSY 2 will occur. Beyond the count of 6 (21 to 30 milliseconds after $X_A$ goes low), however, the circuit becomes immune to activity on the T and R leads. Timer A continues to count and at the count of 12, the HOUT buffer is pulled low to energize hold bridge relay H, FIG. 1, $X_D$ must be high when a count of 15 is reached and the BUSY 1 to HOLD transition occurs, or the circuit will go through the HOLD state to the IDLE state. A minimum of 10 milliseconds is allowed for the H relay to operate and $X_D$ to go high. When the HOLD state is entered, Timer B is reset and held reset. As long as CO/PBX battery is not interrupted ($X_D$ remains high) and the pick-up key is not depressed ($X_A$ remains low ), Timer A stays reset.

The call is picked up again ($X_A = 1$) at $t = 3.0$ seconds, enabling Timer A to count at the rate of FCLK. After 15 conts, 50 to 65 milliseconds, a transition back to BUSY 1 occurs. Upon entering the BUSY 1 state, Timer A is reset, but $X_D$ remains high until the hold bridge is dropped and line transients subside, satisfying the conditions for an intermediate transition to BUSY 2. Since $T_{3B} = 0$, Timer A will begin counting at the rate of FCLK as soon as $X_d$ goes low. The circuit will return to the BUSY 1 state and wait for the next event. Timer B will continue to count until it locks up. The first evidence of a disconnect appears at $t = 5.0$ seconds, when a pulse occurs on $X_D$ in response to the station network being disconnected from the CO/PBX line. A transition from BUSY 1 to BUSY 2 occurs to record or remember the $X_D$ pulse. At the end of the pulse on $X_D$, Timer A is enabled with MCLK but after only a single count, the A-lead is open-circuited ($X_A = 0$) and the conditions for a BUSY 2 to IDLE transition are satisfied which in effect is a station disconnect signal.

Pick-up from IDLE Sequence: (I — B — H — B — H — I)

The pick-up from IDLE sequence shown in FIGS. 4 and 7 cover state transitions and timer activity which occur when a user originates a call, puts it on hold, picks it up, immediately puts it on hold again, and the distant party disconnects. Just prior to $t = 0$, assume that the line circuit is in the IDLE state, $X_A = 0$. $X_T = 0$, Timer A is reset and Timer B is locked up at a count of 3. As the user goes off-hook, the A-lead is grounded ($X_A = 1$) first at $t = 0$. Timer A is enabled to count SCLK, but before it is incremented even once, the station network is connected across the line as the off-hook sequence continues, generating a 50 millisecond pulse on $X_D$ at $t = 0.05$ seconds. The conditions for a transition to BUSY 2 are satisfied ($X_A X_D = 1$). Upon entering the BUSY 2 state, Timer A loses its enable until $X_D$ goes low and Timer B remains locked up ($T_{3B} = 1$). At $t = 0.10$ seconds, Timer A begins counting MCLK, during which time an attempt to put the line on hold would result in a disconnect. If the station happens to have a rotary dial, there will be considerable state and timer activity within the two BUSY states in response to the dial pulsing, but less than 1.0 seconds after the last dial pulse, the circuit will have returned to the BUSY 1 state, permitting the user to put a call on HOLD. Returning to the timing diagram, TIMER A reaches a count of 15 at $t = 1.0$ seconds and a transition to BUSY 1 is made.

Presumably, the user will require time to dial a number, wait for the distant party to answer and start a conversation before he will put the call on HOLD. In the timing diagram, however, all of these events have been compressed into less than 2.0 seconds and at $t = 2.0$ seconds, the hold key is depressed, open-circuiting the A-lead. Timer A is enabled and the sequence of events described in the pickup from ring sequence occurs, resulting in a transition to the HOLD state. The call is picked up again at $t = 3.0$ seconds, just as in the previous sequence. Note that Timer B was reset while in the HOLD state, so that immediately after returning to th BUSY 2 state from HOLD, the transition from BUSY 2 state to BUSY 1 will be timed using FCLK, allowing a call to be put back on HOLD immediately after it has been picked up from HOLD. Timer B is active in the BUSY states counting out the time that the fast switchhook depression timing interval will be used. At $t = 3.5$ seconds, the call is put on HOLD again, an action that would have failed were it is not for the faster BUSY 2 to BUSY 1 timing after returning to the BUSY state from HOLD or RING.

The two final events in this sequence are CO/PBX open intervals which are generated when CO or PBX equipment momentarily interrupt battery to a line or shunt a line with a low impedance. There are two classes of open intervals of interest in the design of CO/PBX line circuits. One class of battery interruptions is a consequence of normal CO or PBX switching (to and from originating registers, etc.) and should be ignored by the line circuit. The other class of open intervals are intended to return a held line to the IDLE condition by releasing the hold bridge. This capability is provided to allow held lines to be dropped when distant parties disconnect. In general, the open intervals generated in response to disconnects are longer than those which occur during normal switching for a given CO or PBX. By sensing the length of open intervals, then, the line circuit can distinguish true disconnect open intervals from shorter switching opens. This is accomplished by including a timed transition from HOLD to IDLE which performs hold abandon timing. As long as loop current flows through the hold bridge (and shunt line detector), the shunt line detector pulls DIN high, providing a steady-state indication of loop current flow. Should CO/PBX battery be interrupted, $X_D$ will go low enabling Timer A to count one of two selectable rates, MCLK or FCLK. If $X_D$ remains low until Timer A reaches one of two selectable counts, 4 or 7, a transition to IDLE will occur; otherwise Timer A will be reset when CO/PBX battery is reapplied. An option is provided via the HIN input which controls the length of the timing interval to accommodate the different types of COs and PBXs.

HIN is connected to V— ($X_H = 0$) to provide long hold abandon timing which is implemented in the logic by counting MCLK with Timer A when $X_D$ goes low while in the HOLD state. If a count of 7 is reached, a transition to IDLE occurs.

Connecting HIN to V+ ($X_H = 1$), provides short hold abandon timing which is implemented by counting FCLK with Timer A when $X_D$ goes low while the circuit is in the HOLD state. If a count of 4 is reached, a transition to IDLE occurs.

The timing diagram (FIG. 7) shows two open intervals which might be generated by a switching machine that conforms to current standards. At $t = 4.0$ seconds, a 250 millisecond reswitch open occurs, during which time $X_D$ goes low. Since $X_A = 0$, selecting the long (standard) hold abandon timing interval, the logic circuit will begin counting MCLK when $X_D$ goes low. At a count of 4, however, battery is reapplied, causing $X_D$ to go high again which rests Timer A. If the distant party should disconnect, the central office will eventually interrupt CO battery for at least 600 milliseconds. Starting at $t = 5.0$ seconds, a 1.0 second disconnect open is generated. $X_D$ goes low enabling Timer A to count MCLK. When the timer reaches a count of 7, conditions are satisfied for a HOLD to IDLE transition. Upon entering the IDLE state, the hold bridge is dropped and Timer B is enabled to count MCLK until it locks up in anticipation of an IDLE to BUSY 2 transition for which is desirable to have Timer B locked up at a count of 3. When CO battery is reapplied to the line at the end of the open interval ($t = 6.0$ seconds), a voltage transient is produced on the line which causes the shunt line detector to generate a 50 millisecond pulse on $X_D$. Timer A is momentarily enabled to count MCLK, but the pulse is less than the minimum ring-up delay interval and no transition to the RING state occurs.

SLow Switchhook Depression: (I — B — I)

The slow switchhook depression sequence as shown in FIGS. 4 and 8 exemplifies the response of the line circuit to deliberately slow operation of the switchhook. Initially the circuit is in the IDLE state, $X_A = 0$, $X_D = 0$, at $t = 0$ pick up begins with the A-lead being grounded. Timer A is enabled to count SCLK, but at $t = 1.0$ seconds, a 50 millisecond pulse on $X_D$ caused by the station network being connected across tip and ring generates an IDLE to BUSY 2 transition and hence the $X_D$ pulse is recorded. When $X_D$ goes low again, Timer A is enabled to count MCLK until 15 is reached, at which time a transition to BUSY 1 occurs. At $t = 4.0$ seconds, a slow switchhook depression is initiated when the station network is open-circuited, generating a 50 millisecond pulse on $X_D$ which forces a transition to the BUSY 2 state and again recording the $X_D$ pulse. Timer A starts counting MCLK in anticipation of $X_A$ going low. 0.8 seconds after tip and ring is opened, the A-lead is open-circuited and a transition back to IDLE occurs. If the A-lead had been opened greater than 1.0 seconds after the line was open-circuited, the circuit would have had sufficient time to return to the BUSY 1 state, and the switchook action would have caused a transition to the HOLD state. Generating slow switchook intervals of such length, however, requires careful and deliberate misuse of the switchhook or pick-up keys.

Test Co Line

The test Co line feature of the logic chip is arranged to allow the craftsperson to easily determine if a C or PBX line is connected to the line circuit. The feature is activated by connecting the TIN input (FIG. 1) to V+ which energizes the hold bridge if and only if the circuit is in the IDLE state ($Y_I X_T = 1$). If loop current flows ($Y_I X_D X_T = 1$), LED indicator in the line circuit is illuminated indicating that CO battery is present. The conditions required to enable Timer A to count MCLK in the IDLE state include $\overline{X_T}$; this term prevents Timer A from counting and causing a transition to RING if $X_D$ goes high during the test. If should be noted that the TIN input can be connected to V+ when the circuit is in the BUSY state without in any way interfering with the operation of the communication connection.

Circuit Implementation

FIGS. 11 through 15 show one implementation of the circuit represented in the state diagram, FIG. 4, and described in detail hereinbefore. Since the circuit operation and timing sequences, as well as the input and output signals, have been fully explained both in terms of actual circuit operation and in terms of the state diagram it would serve no purpose to describe in detail the operation of each gate and flip-flop of the illustrative embodiment of FIGS. 11 through 15. As shown, the logic consists solely of multiple input, single output inverting (NAND) gates. In FIGS. 11 through 15 the following conventions are assumed:

1. All gates are identified by a mnemonic name which also refers to the logic signal that the gate generates.
2. The input and output buffers are identified by a B in the gate symbol and are not I²L cells. In general, they are multiple bipolar transistor structures. All other gates are implemented as I²L cells.
3. An S in a logic gate symbol denotes a slow gate which has an average propagation dely 2 to 5 times longer than that of a standard unmarked I²L gate.
4. Delayed versions of signals begin with the letter D.

T and R Lead Interface

The manner in which the T and R leads interface with the line circuit control circuit is disclosed in co-pending U.S. Patent application, Ser. No. 709,421, filed July 28, 1976 by Angner and Lacy. The details of the above-mentioned application will not be repeated herein but are incorporated by reference.

Lamp Control Circuitry

The manner in which lamp signals are controlled on lead L (FIG. 1) is disclosed in copending U.S. Patent application, Ser. No. 708,846, filed July 28, 1976 by Angner and Lacy. The details of the above-mentioned application will not be repeated herein but are incorporated by reference.

What is claimed is:

1. A line circuit for use in a key telephone system for controlling the hold function between a switching machine and at least one telephone station, said line circuit adapted for A-lead control between said line circuit and said station, said hold control circuit comprising
   means for providing a momentary station transition signal whenever any of said telephone stations makes a transition from an on-hook to off-hook condition or from an off-hook to an on-hook condition,
   means for detecting the presence or absence of a signal on said A-lead,
   means for establishing first and second timed intervals where said second timed interval is longer than said first timed interval,
   means for recording any provided circuit transition signal for a period of time determined by said established first timed interval,
   means for recording a subsequently provided station transition signal for a period of time determined by said established second timed interval,
   means controlled jointly by a detected absence of a signal on said A-lead and a recorded provided station transition signal for providing a station disconnect signal,
   means for providing a hold bridge enable signal upon a detected absence of a signal on said A-lead and a concurrent absence of a recorded subsequently provided station transition signal, and
   means operable during said first timed interval when a provided circuit transition is recorded for reducing said second timed interval to said first timed interval.

2. The invention set forth in claim 1 further comprising
   means for detecting ringing signals applied to said line circuit,
   means operable in response to the detection of said ringing signals for reducing said second timed interval to said first timed interval.

3. The invention set forth in claim 2 further comprising
   means for recording any detected absence of said A-lead signal for a period of time determined by said second timed interval, and
   means for providing said station disconnect signal upon a detected station transition signal occurring only within said recorded second timed interval.

4. The invention set forth in claim 2 further including
   means for delaying the enabling of said ringing signal detecting means for variable period of time after a first detected ringing signal.

5. The invention set forth in claim 4 wherein said ringing signal detector means is said momentary station transition signal providing means.

6. A line circuit for use in a key telephone system wherein said line circuit is adapted to control communication connections between a central switching machine and a telephone station and to provide visual signals to said telephone station representative of the circuit state of said line circuit, said line circuit having at least idle, hold and busy states, said line circuit comprising
- means for detecting the presence or absence of a digital signal on an A-lead from said telephone station,
- means for generating a digital signal in response to signal transitions on the communication leads between said switching machine and said station,
- means for detecting the presence or absence of said generated digital communication lead signal,
- means for comparing said detected digital A-lead signal with said detected digital communication lead signal, and
- a digital timer operative for timing both said digital A-lead signal and said digital communication lead signal,
- means controlled by said digital timer for determining which of said communication lead signal transitions are a result of station transitions from the off-hook to the on-hook condition,
- means for recording any said determined station transition signal or a first period of time controlled by said digital timer, and
- means controlled jointly by said digital timer and said comparing means for enabling said hold state upon a detected absence of said digital A-lead signal and a concurrently recorded absence of said station transition signal.

7. The invention set forth in claim 6 further comprising
- means operable during said first period of time and controlled by said digital timer when a subsequent station transition is determined for reducing said first period of time to a second period of time.

8. The invention set forth in claim 6 further comprising means controlled by said digital timer for determining which of said communication lead signal transitions are a result of ringing signals applied to said line,
- means controlled by said last-mentioned determining means for enabling said line circuit to assume a ring state,
- means controlled by said digital timer for reducing said first period of time to a second period of time when a subsequent station transition signal is determined.

9. The invention set forth in claim 6 further comprising visual indicator means or displaying the present state of said line circuit,
- means for enabling a switching machine battery presence test,
- means operative in response to the enabling of said battery presence test for determining the presence of said battery, and
- means enabled jointly by the determined presence of said battery and the idle state of said line circuit for illuminating said visual indicator means.

* * * * *